United States Patent
Gebhart et al.

(10) Patent No.: US 7,793,290 B2
(45) Date of Patent: Sep. 7, 2010

(54) GRIP APPLICATION ACCELERATION BY EXECUTING GRID APPLICATION BASED ON APPLICATION USAGE HISTORY PRIOR TO USER REQUEST FOR APPLICATION EXECUTION

(75) Inventors: Alexander Gebhart, Bad Schoenborn (DE); Erol Bozak, Pforzhelm (DE)

(73) Assignee: SAP AG, Walldorf (DE)

( * ) Notice: Subject to any disclaimer, the term of this patent is extended or adjusted under 35 U.S.C. 154(b) by 1643 days.

(21) Appl. No.: 11/017,089

(22) Filed: Dec. 20, 2004

(65) Prior Publication Data

US 2006/0168174 A1 Jul. 27, 2006

(51) Int. Cl.
G06F 9/46 (2006.01)
G06F 9/44 (2006.01)
G06F 15/173 (2006.01)

(52) U.S. Cl. .................. 718/100; 718/104; 718/105; 717/127; 717/128; 717/130; 717/131; 709/223; 709/224; 709/225; 709/226

(58) Field of Classification Search .............. 718/1, 718/100, 101, 102, 103, 104, 105; 717/120, 717/124, 127, 128, 130, 131; 709/201, 203, 709/223–226
See application file for complete search history.

(56) References Cited

U.S. PATENT DOCUMENTS

| | | | |
|---|---|---|---|
| 5,276,789 A | 1/1994 | Besaw et al. | |
| 5,440,722 A | 8/1995 | VanderSpek et al. | |
| 5,539,883 A | 7/1996 | Allon et al. | |
| 5,572,724 A | 11/1996 | Watanabe et al. | |
| 5,659,694 A | 8/1997 | Bibayan | |
| 5,699,532 A | 12/1997 | Barrett et al. | |
| 5,761,429 A | 6/1998 | Thompson | |
| 5,784,552 A | 7/1998 | Bishop et al. | |
| 5,983,310 A * | 11/1999 | Adams | 711/6 |
| 5,996,012 A | 11/1999 | Jarriel | |
| 6,009,455 A | 12/1999 | Doyle | |
| 6,061,505 A | 5/2000 | Pitchaikani et al. | |
| 6,098,108 A | 8/2000 | Sridhar et al. | |
| 6,182,086 B1 | 1/2001 | Lomet et al. | |

(Continued)

FOREIGN PATENT DOCUMENTS

JP 05-216845 8/1993

(Continued)

OTHER PUBLICATIONS

R. Buyya and M. Baker (Eds.:); Data Management in an International Data Grid Project; pp. 77-90, 2000. Springer-Verlag Berlin Heidelberg 2000.*

(Continued)

Primary Examiner—Meng-Ai An
Assistant Examiner—Abdullah Al Kawsar
(74) Attorney, Agent, or Firm—Finnegan, Henderson, Farabow, Garrett & Dunner LLP

(57) ABSTRACT

A method includes, in a grid network, maintaining an application usage history by a grid manager or similar component, executing an application according to information contained in the application usage history prior to a user request to execute the application, caching results generated from execution of the application, and providing the cached results in response the user request to execute the application.

15 Claims, 3 Drawing Sheets

U.S. PATENT DOCUMENTS

| | | | |
|---|---|---|---|
| 6,209,018 B1 | 3/2001 | Ben-Shachar et al. | |
| 6,226,675 B1 | 5/2001 | Meltzer et al. | |
| 6,256,740 B1 | 7/2001 | Muller et al. | |
| 6,289,382 B1 | 9/2001 | Bowman-Amuah | |
| 6,385,639 B1 | 5/2002 | Togawa | |
| 6,401,097 B1 | 6/2002 | McCotter et al. | |
| 6,430,609 B1 | 8/2002 | Dewhurst et al. | |
| 6,453,349 B1 | 9/2002 | Kano et al. | |
| 6,466,980 B1 | 10/2002 | Lumelsky et al. | |
| 6,502,131 B1 | 12/2002 | Vaid et al. | |
| 6,567,838 B1* | 5/2003 | Korenshtein | 718/100 |
| 6,574,635 B2 | 6/2003 | Stauber et al. | |
| 6,615,278 B1 | 9/2003 | Curtis | |
| 6,628,304 B2 | 9/2003 | Mitchell et al. | |
| 6,650,347 B1 | 11/2003 | Nulu et al. | |
| 6,751,795 B1 | 6/2004 | Nakamura | |
| 6,775,830 B1 | 8/2004 | Matsunami et al. | |
| 6,789,170 B1 | 9/2004 | Jacobs et al. | |
| 6,799,251 B1 | 9/2004 | Jacobs et al. | |
| 6,813,637 B2* | 11/2004 | Cable | 709/226 |
| 6,813,763 B1* | 11/2004 | Takahashi et al. | 717/151 |
| 6,816,944 B2* | 11/2004 | Peng | 711/133 |
| 6,826,568 B2 | 11/2004 | Bernstein et al. | |
| 6,832,220 B1 | 12/2004 | Rahman | |
| 6,834,301 B1 | 12/2004 | Hanchett | |
| 6,859,834 B1 | 2/2005 | Arora et al. | |
| 6,912,587 B1 | 6/2005 | O'Neil | |
| 6,918,113 B2* | 7/2005 | Patel et al. | 717/178 |
| 6,967,728 B1 | 11/2005 | Vidyanand | |
| 6,976,258 B1 | 12/2005 | Goyal et al. | |
| 7,010,596 B2 | 3/2006 | Bantz et al. | |
| 7,051,107 B2 | 5/2006 | Morikawa | |
| 7,093,243 B2* | 8/2006 | Bailey et al. | 717/166 |
| 7,096,248 B2 | 8/2006 | Masters et al. | |
| 7,103,594 B1* | 9/2006 | Wolfe | 707/5 |
| 7,124,062 B2 | 10/2006 | Gebhart | |
| 7,130,891 B2 | 10/2006 | Bernardin et al. | |
| 7,171,470 B2 | 1/2007 | Doyle et al. | |
| 7,171,654 B2 | 1/2007 | Werme et al. | |
| 7,181,743 B2 | 2/2007 | Werme et al. | |
| 7,185,046 B2 | 2/2007 | Ferstl et al. | |
| 7,234,032 B2 | 6/2007 | Durham et al. | |
| 7,290,048 B1* | 10/2007 | Barnett et al. | 709/223 |
| 7,302,425 B1* | 11/2007 | Bernstein et al. | 707/3 |
| 7,322,031 B2 | 1/2008 | Davis et al. | |
| 7,328,406 B2 | 2/2008 | Kalinoski et al. | |
| 7,490,073 B1* | 2/2009 | Qureshi et al. | 706/50 |
| 7,509,412 B2* | 3/2009 | Creamer et al. | 709/224 |
| 7,546,598 B2* | 6/2009 | Blumenthal et al. | 718/1 |
| 7,559,060 B2 | 7/2009 | Schmidt et al. | |
| 7,574,661 B2* | 8/2009 | Matsuura et al. | 715/745 |
| 7,676,560 B2 | 3/2010 | McCollum | |
| 2001/0049594 A1 | 12/2001 | Klevans | |
| 2001/0054034 A1 | 12/2001 | Arning et al. | |
| 2002/0019844 A1 | 2/2002 | Kurowski et al. | |
| 2002/0078209 A1* | 6/2002 | Peng | 709/227 |
| 2002/0083183 A1* | 6/2002 | Pujare et al. | 709/231 |
| 2002/0095434 A1* | 7/2002 | Lane | 707/201 |
| 2002/0167954 A1 | 11/2002 | Highsmith et al. | |
| 2002/0174189 A1* | 11/2002 | Peng | 709/217 |
| 2002/0194251 A1 | 12/2002 | Richter et al. | |
| 2003/0005068 A1 | 1/2003 | Nickel et al. | |
| 2003/0033369 A1 | 2/2003 | Bernhard | |
| 2003/0041130 A1 | 2/2003 | Harrisville-Wolff et al. | |
| 2003/0041142 A1 | 2/2003 | Zhang et al. | |
| 2003/0088580 A1 | 5/2003 | Desai et al. | |
| 2003/0093528 A1 | 5/2003 | Rolia | |
| 2003/0101331 A1 | 5/2003 | Boylan et al. | |
| 2003/0126196 A1 | 7/2003 | Lagimonier et al. | |
| 2003/0126265 A1 | 7/2003 | Aziz et al. | |
| 2003/0197726 A1 | 10/2003 | Weitzman | |
| 2004/0059963 A1 | 3/2004 | Simonnet et al. | |
| 2004/0179481 A1 | 9/2004 | Graupner | |
| 2004/0194084 A1 | 9/2004 | Matsunami et al. | |
| 2004/0215590 A1 | 10/2004 | Kroening | |
| 2004/0215614 A1 | 10/2004 | Doyle et al. | |
| 2004/0215973 A1 | 10/2004 | Kroening | |
| 2004/0225711 A1 | 11/2004 | Burnett et al. | |
| 2004/0255291 A1 | 12/2004 | Sierer et al. | |
| 2004/0261053 A1 | 12/2004 | Dougherty et al. | |
| 2004/0268147 A1 | 12/2004 | Wiederin et al. | |
| 2004/0268293 A1 | 12/2004 | Woodgeard | |
| 2005/0015437 A1 | 1/2005 | Strait | |
| 2005/0015643 A1 | 1/2005 | Davis et al. | |
| 2005/0027785 A1 | 2/2005 | Bozak et al. | |
| 2005/0027812 A1 | 2/2005 | Bozak et al. | |
| 2005/0027813 A1 | 2/2005 | Bozak et al. | |
| 2005/0027843 A1 | 2/2005 | Bozak et al. | |
| 2005/0027864 A1 | 2/2005 | Bozak et al. | |
| 2005/0027865 A1 | 2/2005 | Bozak et al. | |
| 2005/0044251 A1 | 2/2005 | Bozak et al. | |
| 2005/0060272 A1 | 3/2005 | Lin | |
| 2005/0060349 A1 | 3/2005 | Shirin et al. | |
| 2005/0076105 A1 | 4/2005 | Keohane et al. | |
| 2005/0076339 A1 | 4/2005 | Merril et al. | |
| 2005/0125537 A1 | 6/2005 | Martins et al. | |
| 2005/0131898 A1 | 6/2005 | Fatula, Jr. | |
| 2005/0138156 A1 | 6/2005 | Gebhart et al. | |
| 2005/0138618 A1 | 6/2005 | Gebhart | |
| 2005/0149294 A1 | 7/2005 | Gebhart | |
| 2005/0160107 A1 | 7/2005 | Liang | |
| 2005/0160423 A1 | 7/2005 | Bantz et al. | |
| 2005/0165912 A1 | 7/2005 | Colbeck et al. | |
| 2005/0183143 A1* | 8/2005 | Anderholm et al. | 726/22 |
| 2005/0235055 A1 | 10/2005 | Davidson | |
| 2005/0262506 A1* | 11/2005 | Dawson et al. | 718/100 |
| 2006/0005181 A1 | 1/2006 | Fellenstein et al. | |
| 2006/0015285 A1 | 1/2006 | Fuller et al. | |
| 2006/0020628 A1* | 1/2006 | Huberman et al. | 707/104.1 |
| 2006/0075070 A1 | 4/2006 | Merissert-Coffinieres et al. | |
| 2006/0136506 A1 | 6/2006 | Gebhart et al. | |
| 2006/0168158 A1 | 7/2006 | Das | |
| 2006/0277271 A1* | 12/2006 | Morse et al. | 709/217 |
| 2006/0294238 A1 | 12/2006 | Naik et al. | |
| 2008/0052729 A1 | 2/2008 | Paul et al. | |
| 2008/0222234 A1 | 9/2008 | Marchand | |
| 2009/0007131 A1 | 1/2009 | Woodgeard | |
| 2009/0113395 A1 | 4/2009 | Creamer et al. | |
| 2009/0210826 A1 | 8/2009 | Sierer et al. | |
| 2009/0282404 A1 | 11/2009 | Khandekar et al. | |

FOREIGN PATENT DOCUMENTS

| | | |
|---|---|---|
| JP | 07-311743 | 11/1995 |
| JP | 08-055059 | 2/1996 |
| JP | 08314872 | 11/1996 |
| JP | 10-105383 | 4/1998 |
| JP | 2000-078156 | 3/2000 |
| JP | 2001-331321 | 11/2001 |
| JP | 2002-528797 | 9/2002 |
| JP | 2004-508616 | 3/2004 |
| WO | WO 01/13227 A2 | 2/2001 |
| WO | WO 02/03203 A2 | 1/2002 |

OTHER PUBLICATIONS

European Search Report dated Mar. 1, 2006 pertaining to Application No. 05027221.0-2211.

Walsh, et al., "Staged Simulation for Improving Scale and Performance of Wireless Network Simulations," Institute of Electrical and Electronics Engineers, Proceedings of the 2003 Winter Simulation Conference, New Orleans, Dec. 7-10, 2003, IEEE, vol. 2 of 2, pp. 667-675.

"Caching In on the Enterprise Grid Turbo-Charge Your Applications with OracleAS Web Cache," An Oracle Technical White Paper, <<http://www.oracle.com/technology/products/ias/web_cache/pdf/ WebCache1012_twp.pdf<<, Feb. 7, 2006.

Jang et al., "A Path Based Internet Cache Design for GRID Application," Lecture Notes in Computer Science, Dec. 2003, pp. 455-458.

"eserver xSeries 335 Type 8676 User's Guide," Feb. 2003, IBM Product User's Guide, Chapter 1, pp. 1-12.

"Grid Computing Q&A with Benny Souder, Vice President, Distributed Database Development, Database and Application Server Technologies," May 22, 2003, pp. 1-9.

"How SunTM Grid Engine, Enterprise Edition 5.3 Works," Nov. 2001, Policy Systems in Sun Grid Engine, Enterprise Edition 5.3 Software, 1-16.

"Hp blade server data sheet," HP Blade Server Data Sheet, Nov. 2001, pp. 2-6.

"IBM eserver xSeries 335," Publication date unknown, IBM Data Sheet, accessed online on Dec. 27 at <http://www.ibm.com/servers/uk/eserver/xseries/literature/xseries_335.html>, 2 pages.

"Sun Cluster Grid Architecture," Sun Microsystems, Inc. 1-42 (2002).

"Sun Powers the Grid," Sun Microsystems, Inc., 1-7 (Feb. 2002).

Aberdeen Group, "Sun's Grid Computing Solutions Outdistance the Competition," An Executive White Paper, May 2002, (22 pages).

About Grid computing [online]. IBM, [retrieved on Apr. 14, 2001]. Retrieved from the Internet: http://www-1.ibm.com/grid/about_grid/index.shtml. 1 page.

Ali et al., "Predicting the Resource Requirements of a Job Submission," California Institute of Technology, pp. 1-4, 2004.

Allcock, et al., "GridMapper: A Tool for Visualizing the Behavior of Large-Scale Distributed Systems," Proceedings 11th IEEE International Symposium on High Performance Distributed Computing IEEE Comput. Soc., Piscataway, NJ, pp. 179-187, Jul. 2002.

Allen, et al., "The Cactus Worm: Experiments With Dynamic Resource Discovery and Allocation in a Grid Environment," International Journal of High Performance Computing Applications Sage Science Press, vol. 15, No. 4, pp. 345-358, 2001.

Baldridge, Kim K. et al., "QMView and GAMESS: Integration into the World Wide Computational Grid," IEEE, pp. 1-25, 2002.

Beiriger, Judy et al., "Constructing the ASCI Computational Grid," 2000, p. 193-9, IEEE Comput. Soc., Los Alamitos, CA.

Berman et al., "The GrADS Project: Software Support for High-Level Grid Application Development," International Journal of High Performance Computing Applications, Sage Science Press, vol. 15, No. 4, pp. 327-344, Jul. 31, 2001.

Berman, Fran et al., "Application-Level Scheduling on Distributed Heterogeneous Networks (Technical Paper)," Proceedings of Supercomputing '96, 1996, Article No. 39, pp. 1-28, University of California—San Diego, La Jolla, CA.

Berstis, Viktors, "Fundamentals of Grid Computing," IBM Corporation, Redbooks Paper, 1-28 (2002).

Braden, R. et al., "Resource ReSerVation Protocol (RSVP), Version 1 Functional Specification," Aug. 12, 1996.

Cactus 4.0, User's Guide, Rev. 1.45, Chapter D9, dated Jan. 19, 2004 (3 pages).

Chase, Jeffrey S., et al., "Dynamic Virtual Clusters in a Grid Site Manager," High Performance Distributed Computing, 2003, Proceedings 12th IEEE International Symposium on Jun. 22-24, 2003, pp. 90-100.

Czajkowski, Karl et al, "Grid Information Services for Distributed Resource Sharing," 2001, pgs. 181-94, IEEE Comput. Soc., Los Alamitos, CA.

Czajkowski, Karl et al., "A Resource Management Architecture for Metacomputing Systems," 1998, vol. 1459, pp. 62-82, University of Southern California, Marina del Rey, CA; Mathematics and Computer Science Division, Argonne, IL.

Czajkowski, Karl et al., "Resource Co-Allocation in Computational Grid: High-Performance Distributed Computing Archive," Proceedings of the 8th IEEE International Symposium on High Performance Distributed Computing Table of Contents, 1999, pp. 1-10.

Dubinsky et al., "A Flexible Rerouting Protocol in ATM Networks," IEEE Infocom '99, Conference on Computer Communications, Proceedings, 18th Annual Joint Conference of the IEEE Computer and Communications Societies, vol. 3, pp. 1488-1496, Mar. 1999.

Eerola, P., et al., "The NorduGrid Architecture and Tools," Retrieved from the Internet: http://www.nordugrid.org, Mar. 2002.

El-Ghazawi, Tarek et al., "A Performance Study of Job Management Systems," Concurrency and Computation: Practice and Experience, John Wiley & Sons, Ltd., pp. 1229-1246, vol. 16 Issue 13, Oct. 2004.

European Examination Report, dated Aug. 1, 2007, for corresponding Ep Application No. 05 027 222.8 (5 pages).

European Search Opinion, dated May 18, 2006, for corresponding EP Application No. 05 027 222.8 (5 pages).

European Search Report dated Mar. 13, 2006 pertaining to Application No. 05027543.7-2211, 7 pages.

European Search Report for Application No. 05027222.8, dated May 18, 2006 (9 pages).

FAQ [online]. IBM, [retrieved on Apr. 14, 2004]. Retrieved from the Internet: http://www-.ibm.com/grid/about grid/faq.shtml. 4 pages.

Ferreira, et al., "Grid computing with the IBM Grid Toolbox," IBM Corporation, Redbooks, Draft, 1-281, Review (Apr. 12, 2004).

Ferreira, et al., "Introduction to Grid Computing with Globus," IBM Corporation, Redbooks, 2nd Edition, 1-268, (2003).

Ferris, Michael et al., "NEOS and CONDOR: Solving Optimization Problems Over the Internet," CRPC-TR98763-S, Mar. 1998, pp. 1-18, Rice University, Houston, TX.

Foster, Ian et al., "A Distributed Resource Management Architecture that Supports Advance Reservations and Co-allocation," IEEE 1999, pp. 27-36.

Foster, Ian et al., "A Grid-Enabled MPI: Message Passing in Heterogeneous Distributed Computer System," 1998, IEEE Comput. Soc., Los Alamitos, CA, pp. 1-15.

Foster, Ian et al., "A Quality of Service Architecture that Combines Resource Reservation and Application Adaptation," 2000, pp. 181-188, IEEE, Piscataway, NJ.

Foster, Ian et al., "The Anatomy of the Grid: Enabling Scalable Virtual Organizations," 2001, pp. 1-25, Argonne National Laboratory, Argonne, IL; University of Chicago, Chicago, IL; University of Southern California, Marina del Rey, CA.

Foster, Ian et al., "The Anatomy of the Grid: Enabling Scalable Virtual Organizations," The International Journal of High Performance Computing Applications, vol. 5, No. 3, Fall 2001.

Foster, Ian et al., "The Physiology of the Grid," 2002, An Open Grid Services Architecture for Distributed Systems Integration, pp. 1-31, Argonne National Laboratory, Argonne, IL; Univeristy of Chicago, Chicago, IL; University of Southern California, Marina del Rey, CA; IBM Corporation, Poughkeepsie, NY.

Frey, James et al., "Condo-G: A Computation Management Agent for Multi-Institutional Grids," 2002, vol. 5, No. 3, pp. 237-246, Kluwer Academic Publishers, Netherlands.

Gianella, et al., "Grid Checkpointing in the European DataGrid Project," Oct. 16, 2002 (5 pages).

Goodale et al., "Checkpoint/Recovery in Cactus 4.0," Oct. 16, 2002 (7 pages).

Goteti, Srikanth et al., "Communication Pattern Based Node Selection for Shared Networks," 2003, pp. 69-76, IEEE Comput. Soc., Los Alamitos, CA.

Goux, Jean Pierre et al., "An Enabling Framework for Master-Worker Applications on the Computational Grid," 2000, pp. 43-50, IEEE Computer Soc., Los Alamitos, CA.

Grid Benefits [online]. IBM, [retrieved on Apr. 14, 2004]. Retrieved from the Internet: http://www-1.ibm.com/grid/about grid/benefits.shtml. pp. 1-2.

IBM and grid: E-business on demand [online]. IBM, [retrieved on Apr. 14, 2004]. Retrieved from the Internet: http://www-1.ibm.com/grid/about grid/ibm grid/ebod.shtml. 1 page.

IBM and grid: How IBM is using grid [online]. IBM, [retrieved on Apr. 14, 2004]. Retrieved from the Internet: http://www-1.ibm.com/grid/about grid/ibm grid/grid today.shtml. 1 page.

IBM and grid: Open standards [online]. IBM, [retrieved on Apr. 14, 2004]. Retrieved from the Internet: http://www-1.ibm.com/grid/about grid/ibm grid/open standards.shtml. 1 page.

IBM and grid: Overview [online]. IBM, [retrieved on Apr. 14, 2004]. Retrieved from the Internet: http://www-1.ibm.com/about grid/ibm grid/index.shtml. 1 page.

IBM and grid: Products and services [online]. IBM, [retrieved on Apr. 14, 2004]. Retrieved from the Internet: http://www-1.ibm.com/grid/about grid/ibm grid/products services.shtml. 2 pages.

IBM and grid: Strategic relationships [online]. IBM, [retrieved on Apr. 14, 2004]. Retrieved from the Internet: http://www-1.ibm.com/grid/about grid/ibm grid/strategic relation.shtml. 1 page.

IBM Grid computing [online]. IBM, [retrieved on Apr. 14, 2004]. Retrieved from the Internet: http://www-1.ibm.com/linux/grid/. 1 page.

Injey, Franck, "External Time Reference (ETR) Requirements on z990," IBM Corporation, Redbooks Flash, 1-20 (2004).

International Search Report for PCT/EP2004/008406, dated Dec. 28, 2004, 7 pgs.

International Search Report for PCT/EP2004/008407, dated Jan. 19, 2005, 6 pgs.

International Search Report for PCT/EP2004/008408, dated Mar. 21, 2005, 16 pgs.

International Search Report for PCT/EP2004/008409, dated Dec. 29, 2004, 6 pgs.

International Search Report for PCT/EP2004/008448, dated Jan. 19, 2005, 7 pgs.

International Search Report for PCT/EP2004/008449, dated Jan. 19, 2005, 6 pgs.

Jitsumori, Hitoshi, "Beginning of the Grid Computing Era," Nikkei Internet Solutions, vol. 69, pp. 81-89, Nikkei Business Publications, Inc., Mar. 22, 2003.

Jitsumori, Hitoshi, "Concentrated Control of a Plurality of Computers as One System," Nikkei Internet Technology, vol. 59, p. 14-15, Nikkei Business Publications, Inc., May 22, 2002.

Konya, B., "The NorduGrid Information System," Retrieved from the Internet: http://www.nordugrid.org, Sep. 16, 2002.

Lacan, Francis, "A Perfect World? A model for transormation," IBM Business Consultilng Services, 1-12, (Apr. 2003), 2 pages.

Lee et al., "visPerf. Monitoring Tool for Grid Computing," Retrieved from the Internet: http://icl.cs.utk.edu.projectsfiles/netsolve/pubs/visperf.pdf, pp. 1-13, Jun. 2003.

Li et al., "Improving Performance via Computational Replication on a Large-Scale Computational Grid," Proceedings of the 3rd IEEE/ACM International Symposium on Cluster Computing and the Grid, 2003, pp. 1-7.

Limaye, K. et al., "Grid aware HA-OSCAR," high Performance Computing Systems and Applications, 2005. HPCS 2005. 19th International Symposium on, vol. No. pp. 211-218, May 15-18, 2005.

Litzkow, Michael J. et al., "Condor—A Hunter of Idle Workstations," 1988, pp. 104-111, 8th International Conference on Distributed Computing Systems, San Jose, CA.

Liu, Chuang et al., "Design and Evaluation of a Resource Selection Framework for Grid Applications," High Performance Distributed Computing 2002, HPDC-11, 2002, Proceedings 11th IEEE International Symposium, Jul. 23-26, 2002, pp. 63-72.

Lowekamp, Bruce et al., "A Resource Query Interface for Network-Aware Applications," 1999, vol. 2, No. 2, pp. 139-151, Baltzer, Netherlands.

Min, et al., "A CICS to Linux Grid Implementation," IBM Corporation, Redbooks Paper, 1-24 (2003).

Nabrzyski Jared et al., "Grid Resource Management, State of the Art and FutureTrends," Sep. 2003, Kluwer Academic Publishers.

Official Notice of Rejection mailed on Apr. 10, 2009 of Japanese Patent Application No. 2006-521509, (2 pages) and translation thereof (3 pages).

Official Notice of Rejection mailed on Apr. 14, 2009 of Japanese Patent Application No. 2006-521512, (5 pages) and translation thereof (6 pages).

Official Notice of Rejection mailed on Apr. 21, 2009 of Japanese Patent Application No. 2006-521513, (2 pages) and translation thereof (3 pages).

Official Notice of Rejection mailed on Apr. 24, 2009 of Japanese Patent Application No. 2006-521515, (3 pages) and translation thereof (4 pages).

Open Grid Services Infrastructure (OGSI), "Open Grid Services Infrastructure (OGSI) Version 1.0," Global Grid Forum, Jun. 27, 2003 (86 pages).

Oracle Grid Computing Technologies [online]. Oracle, [retrieved on Apr. 15, 2004]. Retrieved from the Internet: http://otn.oracle.com/products/oracle9i/grid computing/index.html. 2 pages.

Papakhian, Mary et al., "Comparing Job-Management Systems: The User's Perspective," Apr.-Jun. 1998, vol. 5, No. 2, pp. 4-9, Technology News and Reviews, IEEE Computational Science & Engineering.

Rajkumar Buyya; Nimrod/G., "An Architecture for a Resource Management and Scheduling System in a Global Computational Grid," IEEE Computer Society Press, USA, 2000, pp. 1-7

Rajkumar, Buyya, "Economic-based Distributed Resource Management and Scheduling for Grid Computing," Apr. 2002, pp. 1-166.

Sandholm, Thomas et al., "Java OGSI Hosting Environment Design A Portable Grid Service Container Framework," 2002, pp. 1-20, Argonne National Laboratory, IBM Poughkeepsie, NY.

Smith, Gordon, "Oracle RAC 10g Overview," An Oracle White Paper, Oracle Corporation, 1-15 (Nov. 2003).

Soulder, Benny, "On The Grid," Oracle Corporation, 1-4 (2004).

Special Edition Using Microsoft Excel 2000, Copyright 1999 by Que Corpl. p. 67-68.

Tierney, et al., White Paper: A Grid Monitoring Service Architecture (DRAFT), Retrieved from the internet http://citeseer.ist.psu.edu/530951.htm, Feb. 2001.

Ting et al., "3LS: A Peer-to-Peer Network Simulator," Copyright Sep. 2003.

U.S. Appl. No. 12/326,441, filed Dec. 2, 2008 entitled "Grid Organization," pp. 1-29.

Vadhiyar et al., "A Performance Oriented Migration Framework for the Grid," Proceedings of the Third IEEE/ACM International Symposium on Cluster Computing and the Grid IEEE Comput. Soc., Los Alamitos, CA, pp. 130-137, May 2003.

Von Laszewski et al., "InfoGram: A Grid Service that Supports Both Information Queries and Job Execution," 2002, pp. 333-342, IEEE Computer Society, Proceedings of the 11th IEEE International Symposium on High Performance Distributed Computing, (HPDC '02).

Von Laszewski, et al., "Designing Grid-based Problem Solving Environments and Portals," Proceedings of the 34th Annual Hawaii International Conference on System Sciences IEEE Comput. Soc., Los Alamitos, CA, pp. 1-10, Jan. 2001.

Von Laszewski, et al., "Grid-Based Asynchronous Migration of Execution Context in Java Virtual Machines," Euro-Par 2000 Parallel Processing, 6th International Euro-Par Conference Proceedings, Lecture Notes in Computer Science, vol. 1900, pp. 22-34, Sep. 2000.

Von Laszewski, G., et al., "CoG Kits: A Bridge Between Commodity Distributed Computing and High-Performance," Retrieved from the Internet: http://www-unix.mcs.anl.gov, Jun. 2000, pp. 97-105.

Waananen, et al., "An Overview of an Architecture Proposal for a High Energy Physics Grid," Applied Parallel Computing, Advanced Scientific Computing, 6th International Conference, pp. 76-86, Jun. 2002.

What is grid computing [online]. IBM, [retrieved on Apr. 14, 2004]. Retrieved from the Internet: http://www-1.ibm.com/grid/about grid/what is.shtml. 1 page.

Zenses, Ralf, "N1 Grid Advanced Architecture for SAP Operating concept for SAP Infrastructure," Germany/Austria Sun Microsystems GmbH, Mar. 5, 2004, pp. 1-34.

Zhang et al., "Fault-tolerant Grid Services Using primary-Backup: Feasibility and Performance," Cluster Computing, 2004 IEEE International Conference, San Diego, CA Sep. 20-23, 2004, pp. 105-114.

Oracle RAC 10g Overview, Oracle, An Oracle White Paper, pp. 1-16, Nov. 2003.

Al-Ali et al., "Qos adaptation in service-oriented grids," Proceedings of the 1st Int'l Workshop on Middleware for Grid Computing (MGC2003), Rio de Janeiro, Brazil, Jun. 2003, retrieved from the internet on Oct. 19, 2009 via http://citeseerx.ist.psu.edu/viewdoc/summary?doi=10.1.1.105.2673 (11 pages).

European Examination Report, dated Nov. 4, 2009, for corresponding EP Application No. 04 741 290.3-1243 (5 pages).

European Examination Report, dated Nov. 4, 2009, for corresponding EP Application No. 04 763 539.6-1243 (6 pages).

Johner et al., "Understanding LDAP," IBM Redbook, Jun. 1998, retrieved from the internet on Feb. 2, 2008, http://keinzerberus2000.aldebaran.de/LDAPIBMUnderstandingsg244986.pdf (192 pages).

Official Notice of Rejection mailed on Aug. 11, 2009 of Japanese Patent Application No. 2006-521512, (2 pages) and translation thereof (2 pages).

Official Notice of Rejection mailed on Sep. 11, 2009 of Japanese Patent Application No. 2006-521516, (6 pages) and translation thereof (6 pages).

* cited by examiner

GRIP APPLICATION ACCELERATION BY EXECUTING GRID APPLICATION BASED ON APPLICATION USAGE HISTORY PRIOR TO USER REQUEST FOR APPLICATION EXECUTION

TECHNICAL FIELD

The present invention relates to data processing by digital computer, and more particularly to grid application acceleration.

BACKGROUND

Grid computing is a form of distributed system wherein computing resources are shared across networks. Grid computing enables the selection, aggregation, and sharing of information resources resident in multiple administrative domains and across geographic areas. These information resources are shared, for example, based upon their availability, capability, and cost, as well as a user's quality of service (QoS) requirements. Grid computing can mean reduced cost of ownership, aggregated and improved efficiency of computing, data, and storage resources, and enablement of the creation of virtual organizations for applications and data sharing.

SUMMARY

The present invention provides methods and apparatus, including computer program products, for grid application acceleration.

In an aspect, the invention features a method including, in a grid network, maintaining an application usage history by a grid manager or similar component, executing an application according to information contained in the application usage history prior to a user request to execute the application, caching results generated from execution of the application, and providing the cached results in response the user request to execute the application.

In embodiments, maintaining can include collecting data when the application can be executed. Data can include information relating to how frequently the application was executed. The data can include information relating to how frequently the application was executed with different input parameters, information relating to how frequently the application was executed after execution of another application, and/or information indicating what times the application has been executed and by how many users.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
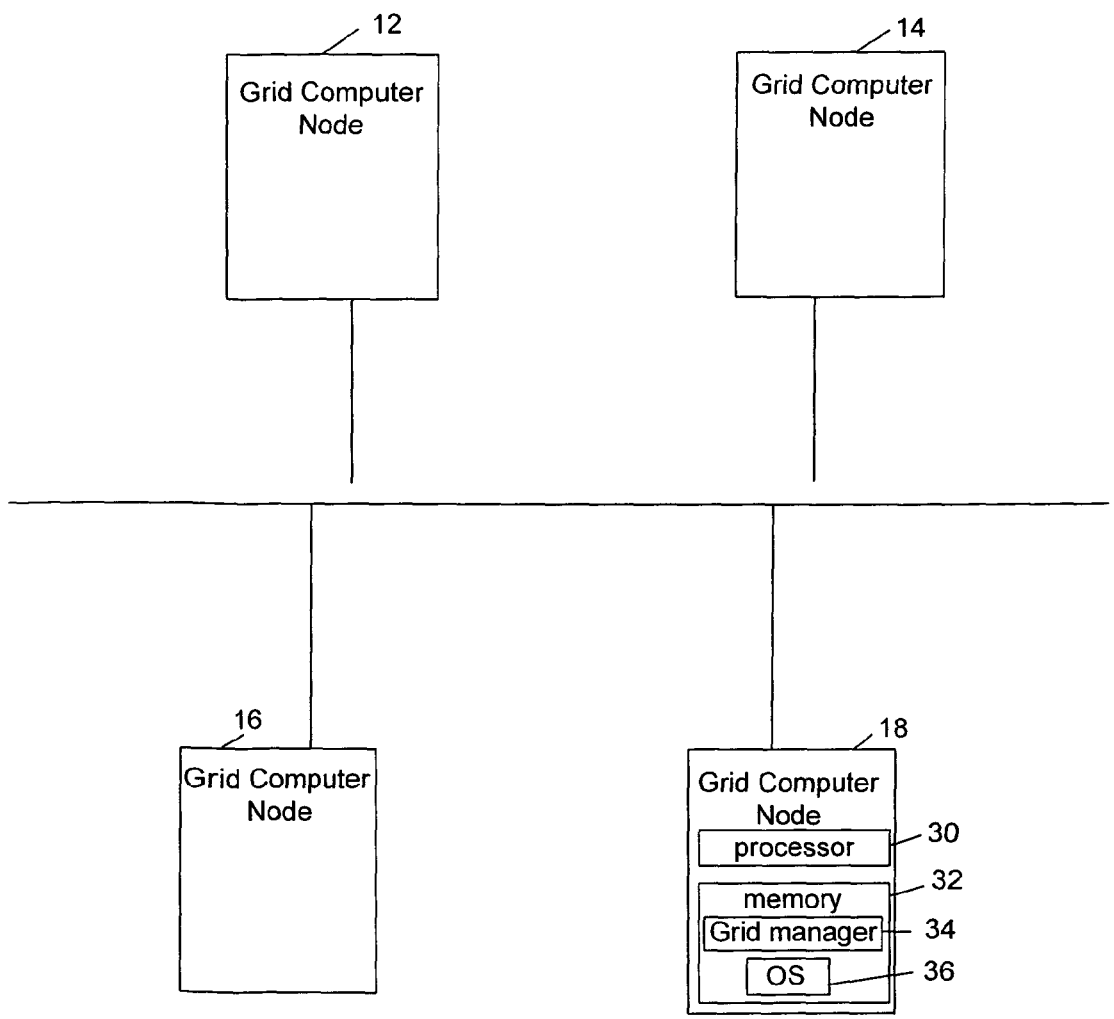
FIG. 1 is block diagram.

As shown in FIG. 1, a grid network 10 in accordance with one embodiment of the invention includes a number of interconnected grid compute nodes 12, 14, 16, 18. In one example, the grid network 10 is implemented as a client-server network. Client/server describes a relationship between two computer programs in which one program, the client, makes a service request from another program, the server, which fulfills the request. Although the client/server idea can be used by programs within a single computer, it is a more important idea in a network, such at network 10. In a network, the client/server model provides a convenient way to interconnect programs that are distributed efficiently across different locations.

In the client/server model, one server, sometimes called a daemon, is activated and awaits client requests. Typically, multiple client programs share the services of a common server program. Both client programs and server programs are often part of a larger program or application. Relative to the Internet, a Web browser is a client program that requests services from a Web server in another computer somewhere on the Internet.

Each of the grid compute nodes, grid compute node 18, for example, can include a processor 30 and a memory 32. Memory 32 includes a grid manager 34 and an operating system (OS) 36, such as Unix, Linux or Windows.

Figure 2:
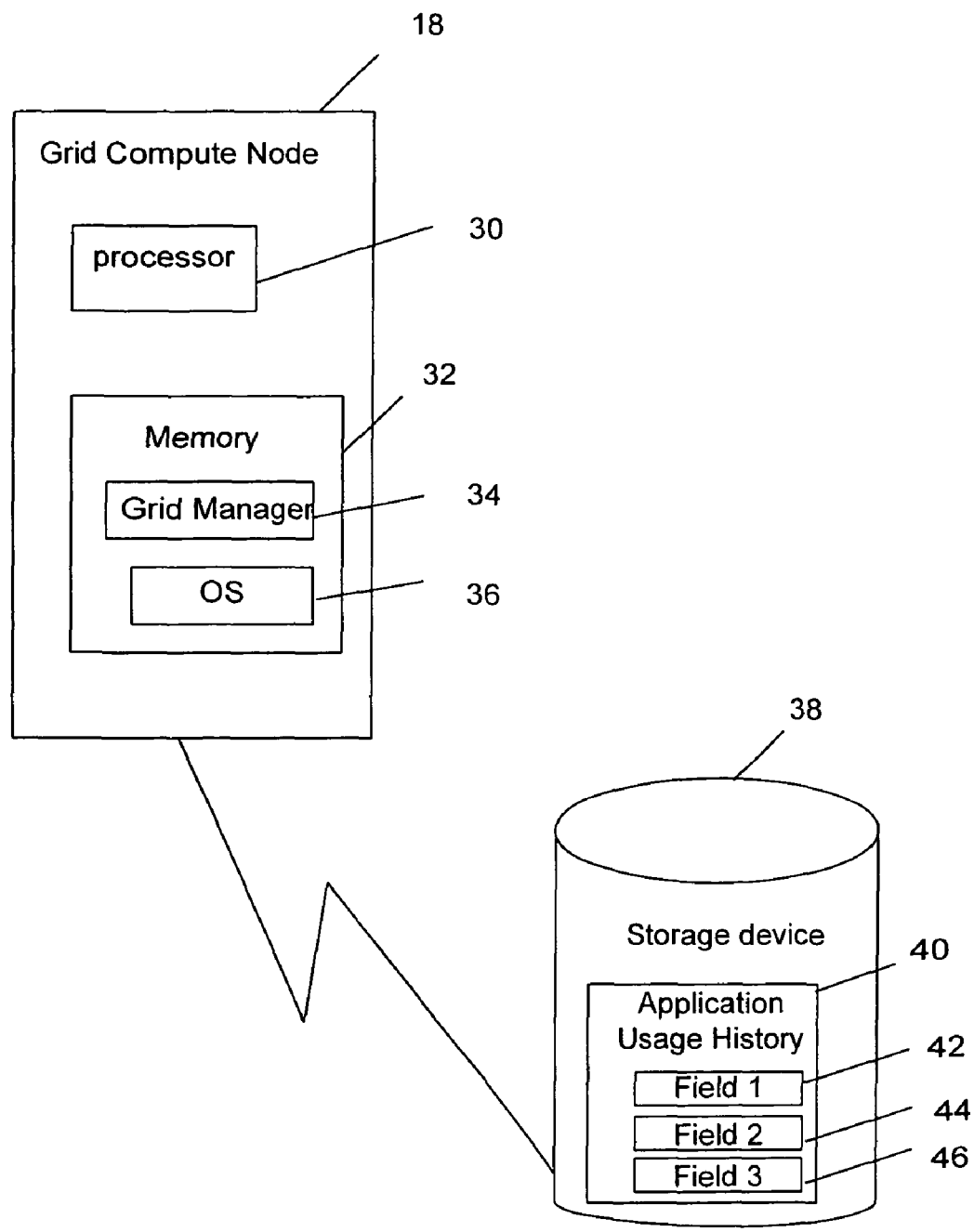
FIG. 2 is a block diagram.

As shown in FIG. 2, each grid compute node, e.g., grid compute node 18, includes a storage device 38. The storage device 38 includes an application usage history file 40. In a particular example, the application usage history file 40 is maintained by the grid manager 34. In another example, the application usage history file 40 is maintained by a database management system.

The application usage history file 40 includes a field 42 that represents how often particular grid-enabled applications are executed or instantiated in a comparatively short time frame with only slightly different parameters. The application usage history file 40 includes a field 44 that represents how often a second particular application is executed or instantiated directly after a first particular grid-enabled application is executed or instantiated. The application usage history file 40 includes a field 46 that represents at which times certain grid-enabled applications have been executed or instantiated, and by how many users.

In a particular example, the grid manager 34 accesses the grid-enabled application usage history file 40 in order to execute and/or instantiate applications prior to an explicit request by a user depending on available grid compute nodes in the network 10. If a particular grid-enabled application is executed or instantiated prior to an explicit request, the resultant data is cached. Using the application usage history file 40, the grid manage 34 can anticipate application requests and generate results in anticipation of requests, thereby accelerating performance of completing any grid-enabled application request.

The grid manager 34 continuously updates the application usage history file 40, making it possible to adjust a behavior of the network 10.

Figure 3:
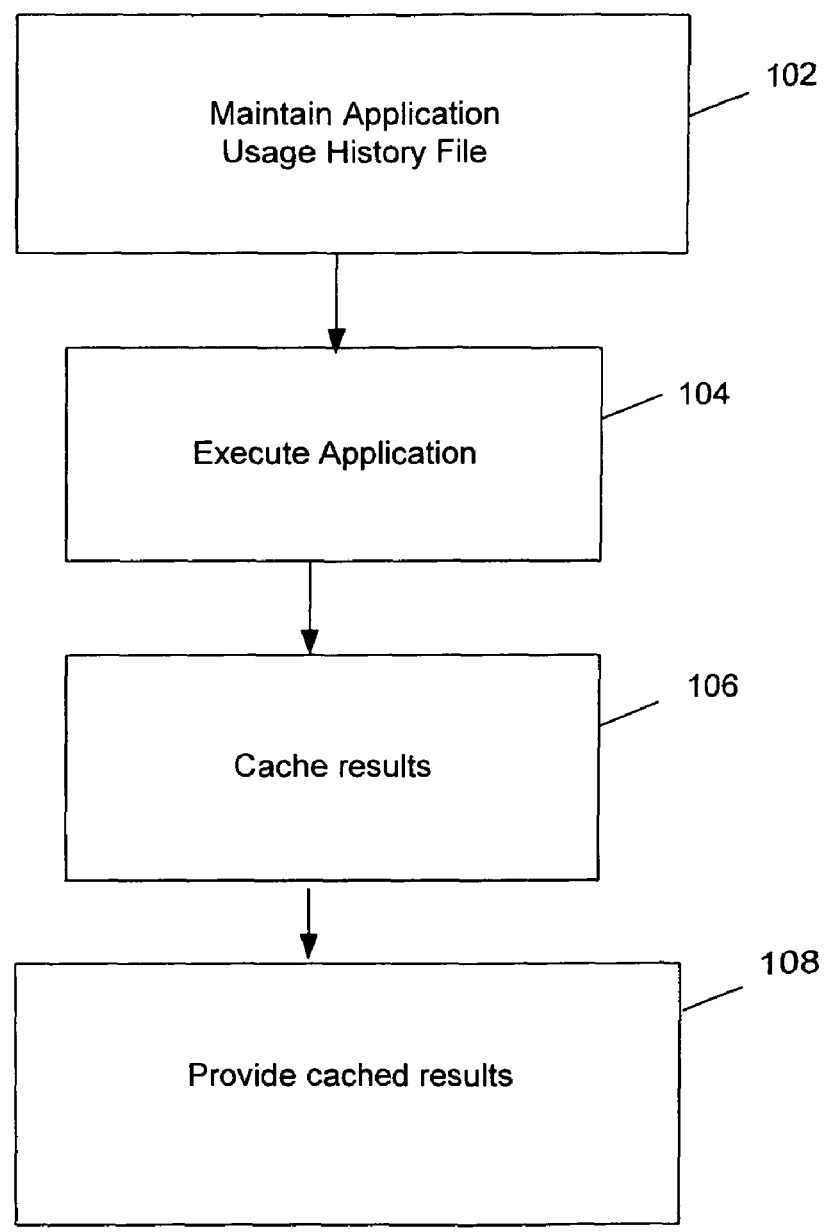
FIG. 3 is flow diagram.
Like reference symbols in the various drawings indicate like elements.

As shown in FIG. 3, a grid-managed application acceleration process 100 includes maintaining (102) an application usage history by a grid manager. The application usage history includes data pertaining to a particular grid-enabled application or applications. For example, the application usage history can include information relating to how frequently the application is executed, how frequently the application is executed with different input parameters, how frequently the application is executed after execution of another application, and what times the application has been executed and by how many users.

Process 100 executes (104) a grid-enabled application according to information contained in the application usage history prior to a user request to execute the application and caches (106) results generated from execution of the application. Process 100 provides (108) the cached results in response to the user request to execute the application, and what times the application has been executed and by how many users.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

What is claimed is:

1. A computer-implemented method executed in a grid network comprising a plurality of grid nodes, the computer-implemented method comprising:

storing an application usage history reflecting execution histories of a plurality of grid applications, the application usage history including data relating to how frequently the grid applications are executed with different input parameters, data relating to how frequently the grid applications are executed after execution of other applications, data indicating times when the grid applications are executed, and data indicating a number of users that have executed the grid applications;

determining a first one of the plurality of grid applications that is likely to be requested for execution by a user, based on at least the execution history of the first grid application reflected by the application usage history;

selecting a first one of the plurality of grid nodes for executing the first grid application, based on availability of the first grid node to execute the first grid application;

executing the first grid application on the first grid node using a computer processor, the first grid application being executed in advance of receiving a corresponding user request from the user requesting execution of the first grid application;

caching results of the first grid application in a storage device;

receiving the corresponding user request for execution of the first grid application; and providing the cached results to the user in response to the user request.

2. The method of claim 1 wherein the application usage history comprises information relating to how frequently the first grid application is executed with different input parameters.

3. The method of claim 1 wherein the application usage history comprises information relating to how frequently the first grid application is executed after execution of another application.

4. The method of claim 1 wherein the application usage history comprises information indicating what times the first grid application has been executed and by how many users.

5. The method of claim 1 wherein the application usage history comprises:

information relating to how frequently the first grid application is executed with different input parameters;

information relating to how frequently the first grid application is executed after execution of another application; and information indicating what times the first grid application has been executed and by how many users.

6. A computer program product, stored in a computer-readable storage device, comprising instructions executable by a processor in a grid network comprising a plurality of grid nodes, the instructions being operable to perform operations comprising:

storing an application usage history reflecting execution histories of a plurality of grid applications, the application usage history including data relating to how frequently the grid applications are executed with different input parameters, data relating to how frequently the grid applications are executed after execution of other applications, data indicating times when the grid applications are executed, and data indicating a number of users that have executed the grid applications;

determining a first one of the plurality of grid applications that is likely to be requested for execution by a user, based on at least the execution history of the first grid application reflected by the application usage history;

selecting a first one of the plurality of grid nodes for executing the first grid application, based on availability of the first grid node to execute the first grid application;

executing the first grid application on the first grid node, the first grid application being executed in advance of receiving a corresponding user request from the user requesting execution of the first grid application;

caching results of the first grid application;

receiving the corresponding user request for execution of the first grid application; and providing the cached results in response to the user request.

7. The product of claim 6 wherein the application usage history comprises information relating to how frequently the first grid application is executed with different input parameters.

8. The product of claim 6 wherein the application usage history comprises information relating to how frequently the first grid application is executed after execution of another application.

9. The product of claim 6 wherein the application usage history comprises information indicating what times the first grid application has been executed and by how many users.

10. The product of claim 6 wherein the application usage history comprises:
   information relating to how frequently the first grid application is executed with different input parameters;
   information relating to how frequently the first grid application is executed after execution of another application; and
   information indicating what times the first grid application has been executed and by how many users.

11. A system in a grid network, the grid network comprising a plurality of grid nodes, the system comprising:
   instructions configured to perform operations comprising:
      storing an application usage history reflecting execution histories of a plurality of grid applications, the application usage history including data relating to how frequently the grid applications are executed with different input parameters, data relating to how frequently the grid applications are executed after execution of other applications, data indicating times when the grid applications are executed, and data indicating a number of users that have executed the grid applications;
      determining a first one of the plurality of grid applications that is likely to be requested for execution by a user, based on at least the execution history of the first grid application reflected by the application usage history;
      selecting a first one of the plurality of grid nodes for executing the first grid application, based on at least availability of the first grid node to execute the first grid application;
      executing the first grid application on the first grid node, the first grid application being executed in advance of receiving a corresponding user request from the user requesting execution of the first grid application;
      caching results generated by the first grid application;
      receiving the corresponding user request for execution of the first grid application; and
      providing the cached results to the user in response to the user request; and
   a computer processor for executing the instructions.

12. The system of claim 11 wherein the application usage history comprises information relating to how frequently the first grid application is executed with different input parameters.

13. The system of claim 11 wherein the application usage history comprises information relating to how frequently the first grid application is executed after execution of another application.

14. The system of claim 11 wherein the application usage history comprises information indicating what times the first grid application has been executed and by how many users.

15. The system of claim 11 wherein the application usage history data comprises:
   information relating to how frequently the first grid application is executed with different input parameters;
   information relating to how frequently the first grid application is executed after execution of another application; and
   information indicating what times the first grid application has been executed and by how many users.

* * * * *